Dec. 3, 1929.  C. G. BUTLER  1,737,783
HIGH PRESSURE LUBRICATOR
Filed Sept. 25, 1926   3 Sheets-Sheet 2

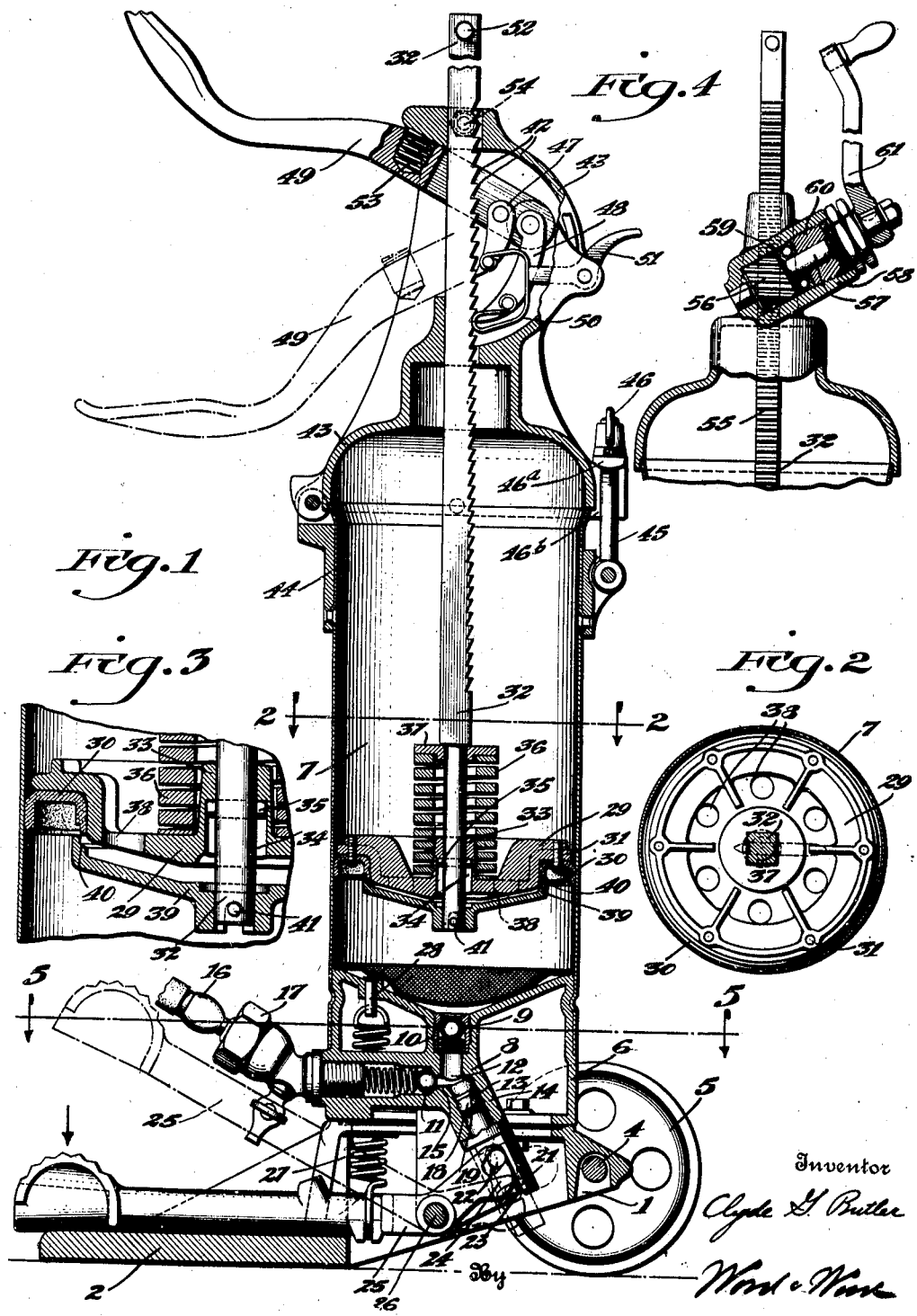

Inventor
Clyde G. Butler
By Wood & Wood
Attorneys.

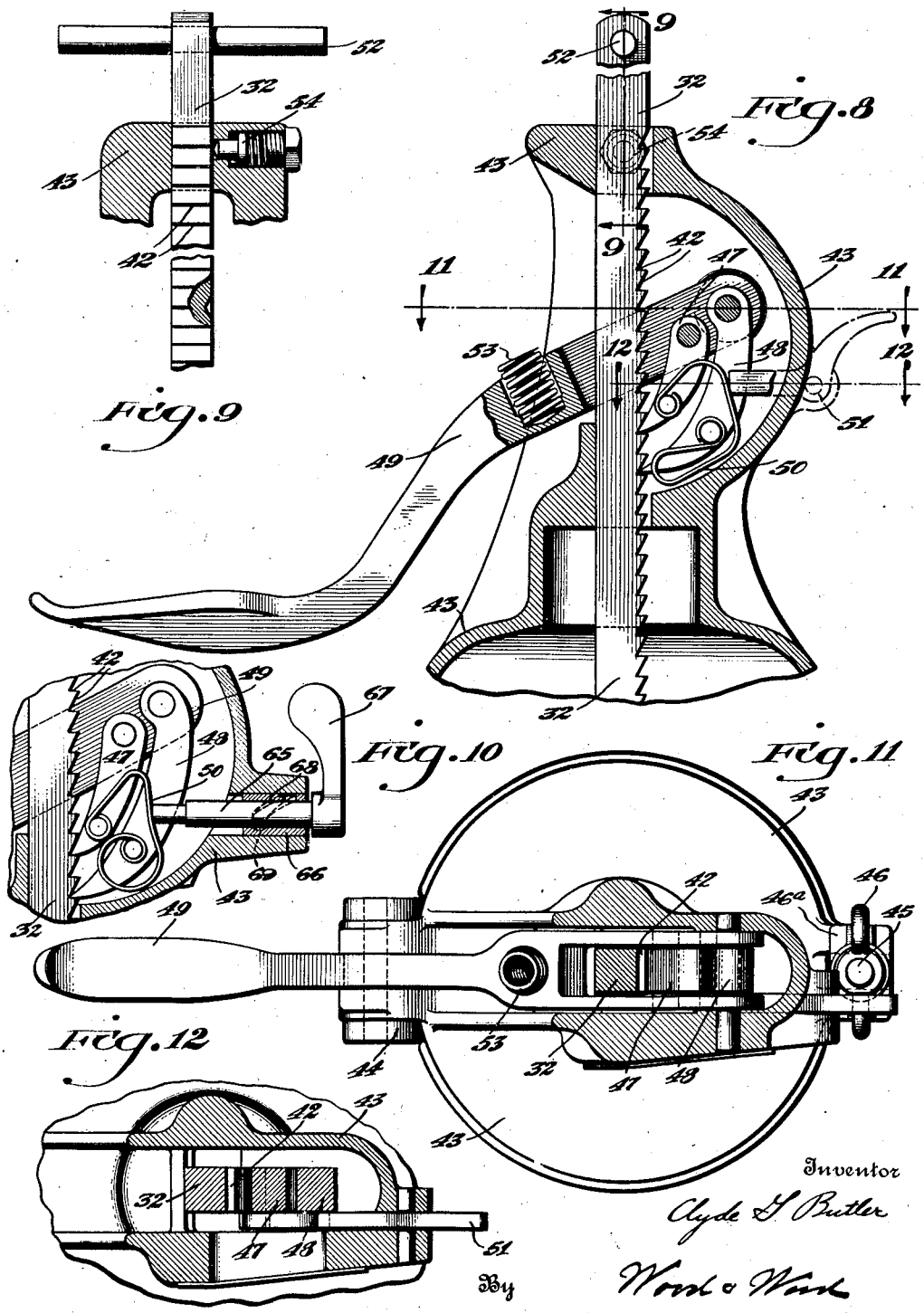

Patented Dec. 3, 1929

1,737,783

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

HIGH-PRESSURE LUBRICATOR

Application filed September 25, 1926. Serial No. 137,783.

The invention relates to improvements in high pressure lubricant distributing pumps used in connection with lubricating systems, as supplying grease to the bearings of an automobile and primarily for service station capacity having a container for holding a large supply of lubricant and adapted to be wheeled about with the pump operated by a foot treadle.

An object of the invention is to provide a pump of such class with a reduced diameter forcer piston operating with a small stroke and actuated by a foot treadle adapting the same to be quickly operated for delivering small quantities of lubricant under high pressure. The pump chamber represents a portion of a delivery conduit leading from the lubricant supply container, the opposite end of the conduit connecting to a pipe or flexible tube for making a connection with the parts being lubricated, and the chamber interposed between check valves in the conduit, the check valves alternately operable under influence of the piston pressure, drawing a small quantity of lubricant into the chamber during a second stroke of the piston and forcibly discharging the same into the delivery portion of the conduit during the reverse stroke of the piston.

Another object of the invention is to provide a high pressure lubricant distributing pump with a follower piston incorporated within the base or supporting head of an upright container adapting the piston to be operated by a foot treadle directly connecting with the piston.

Another object of the invention is to provide a lubricant distributing pump with a cylindrical container having a follower piston plunger movable therein and operated by a jack for applying a head pressure upon the lubricant upright within the container, a piston having a valve member unseating with a retracting motion of the piston to open communication with the cylindrical chambers at opposite sides of the piston and to prevent the forming of vacuum which would interfere with a free withdrawal of the piston.

Another object of the invention is to provide a lubricant distributing pump with a follower piston plunger within the upright container operated for applying a head pressure upon the lubricant, a piston operated by a jack connected therewith through a flexible connection for obtaining a stored pressure to automatically move the piston and maintain the head pressure during a limited withdrawal of the lubricant by the pump so that the jack need only be operated periodically and thereby offer convenience in the use of the pump.

Other objects and certain advantages are more fully set forth in the description of the accompanying drawings forming a part of the specification, in which:

Figure 1 is a central vertical section of the improved portable high pressure lubricator gun or pump.

Figure 2 is a section on line 2—2, Figure 1.

Figure 3 is an enlarged detail sectional view taken centrally through the plunger or follower piston.

Figure 4 is a central vertical section through an upper cylinder head and modified form of jack mechanism in which a worm or spiral gear operated by a crank handle is employed for feeding the piston rod.

Figure 8 is an enlarged central vertical section through the upper cylinder head or cover, and plunger or piston actuating ratchet jack for forcibly moving the plunger or piston against the head of the grease or lubricant in the cylinder for forcing the same toward the outlet or discharge end of the container and also for maintaining a head pressure against the lubricant.

Figure 9 is a section on line 9—9, Figure 8.

Figure 10 is a detailed view showing a modified form of trip lever for releasing the pawls of the jack.

Figure 11 is a section on line 11—11, Figure 8.

Figure 12 is a section on line 12—12, Figure 8.

Figure 5:
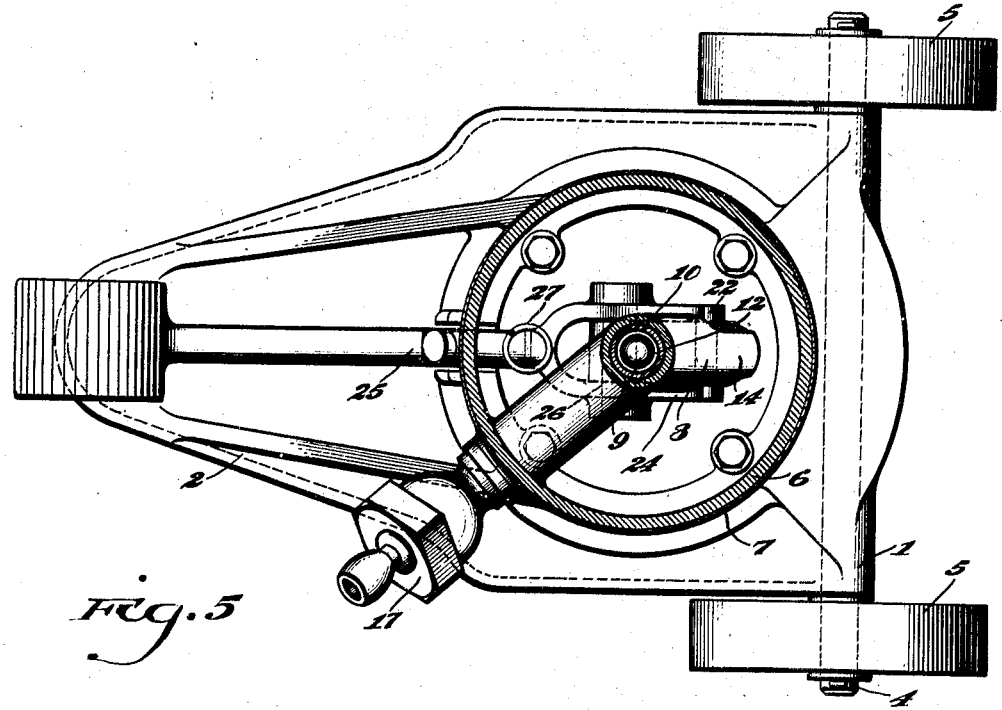
Figure 5 is an enlarged section on line 5—5, Figure 1.

The gun or pump as illustrated is of a portable or wheeled type for a high pressure lubricant delivery, having a treadle operated forcer piston at the base of the vertically disposed cylinder or lubricant holder. The cylinder or container is provided with a plunger or follower piston as a movable head for forcibly compressing the lubricant supply toward the discharge, maintaining a head pressure against the lubricant, the plunger being manually fed by a jack carried by the upper cylinder head or cover, with a spring interposed between the jack mechanism and plunger piston adapted to be compressed, and its stored energy utilized as an auxiliary means for moving the plunger or follower piston to maintain a head pressure upon the lubricant.

Referring to the drawings, 1 indicates a carriage or truck having a trail or foot plate 2 at one end, and an axle 4 for mounting a pair of wheels 5—5 at an opposite end, the trail plate and the wheels being the substantial support for sustaining the cylinder or container in a vertical upright position. A lower cylinder head 6 of hollow construction is fixed upon the body of the carriage and engaged into the lower end of the cylinder or container 7. The head and end of the cylinder are connected together under a fluid tight or sealing joint, and as shown, the sealing connection is formed by providing the head with an annular groove into which the cylinder is crimped, the crimping providing an annular bead compressed into the groove. The head comprises a cast metal body having communicating branch conduits formed therein for a lubricant delivery for providing a cylinder for a forcer piston, the forcer piston operating to withdraw the lubricant from the cylinder or container and discharge the same under a high pressure, adapting the lubricant to be forced between the parts to be lubricated.

As shown, a discharge conduit 8 of angled or L form leads centrally from the face end of the head which is also axially of the cylinder, and is provided with a pair of check valve controlled ports, the check valves being of ball type comprising a check valve 9 disposed at the inlet end of the discharge conduit and within a seat bushing 10 fastened into the end of the conduit, the valve sealing against the return of the lubricant into the container, and is spring pressed against the seat.

A second spring pressed ball check valve 11 is disposed in the angled portion of the conduit with the portion of the conduit between the ball checks providing a chamber 12 into which the lubricant is drawn by the forcer piston 13 slidable within an angle sleeve or branch extension 14 of the conduit 8, and from which it is forced through the port 15 controlled by the ball check 11 into the distributing branch of the conduit 8 and through the tube or pipe connection 16 in connection therewith through a universal fitting 17.

The face wall of the cylinder head 6 is preferably dished or concaved toward the inlet end of the conduit 8 for directing the lubricant as it is forced or drawn downwardly into the chamber 12. The check valve 11 seats under spring pressure toward the discharge chamber 12 and therefore operates reverse or opposite from that of the ball check 9 to close the port 15 and prevent the lubricant from being drawn from the delivery portion of the conduit 8 back into the chamber 12 during the suction stroke of the forcer piston 13.

The forcer piston comprises a pair of reversely disposed cup packings 18—18 separated by a washer 19 and secured to the end of a piston rod 8 sliding within the sleeve 14 by a screw 20 threaded into the end of the rod and axially therewith. The piston rod 21 is provided with a diametrically disposed pin 22 engaged through elongated slots 23—23 in the sleeve 14 for engagement into notches in the yoke limbs 24—24 of the treadle 25. The treadle 25 is pivoted upon a pin 26 secured within the carriage frame 1.

Figure 7:
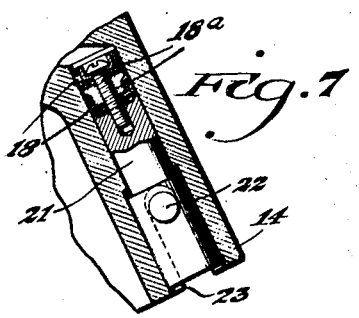
Figure 7 is a detail sectional view showing a modified form of forcer piston.

In Figure 7 the cupped packings 18—18 are shown disposed in the same direction, namely, in the direction in which the piston moves to force the lubricant from the pump conduit. Washers 18ª are inserted in the cupped packings and serve to space and prevent collapse of the packings.

The treadle 25 (in Figure 1) is shown in a depressed position and in dotted lines in its normal position, to which position it is pulled, when the treadle is released by the foot of the operator, by a spring 27 having one end connecting with the treadle and its opposite end engaged through the end of the pin 28 fixed to and depending from the lower or inner side of the face wall of the cylinder head.

Any type or form of hose or pipe distributor connection can be made with the delivery end of the discharge conduit 8, the form herein being illustrated as a flexible tubing having its end connected with a universal joint angle fitting tapped into the conduit 8, the fitting being provided with a vent valve for venting the discharge conduit in the event of any air collecting or accumulating in said conduit, which if permitted to become pocketed will interfere with the delivery capacity of the pump.

The arrangement and location of the forcer piston and its operating treadle provides for actuating the piston under excessive leverage with the treadle conveniently located for actuation by the foot of the operator under a small stroke and for quick actuation, leaving the operator's hands free to manipulate and hold the distributing line. The extended trailing plate of the carriage beneath the treadle, and the relative disposition of the treadle provides against slippage of the carriage as the treadle is being depressed. Convenience of operation is an important factor, particularly, as the pump is primarily intended for use in lubricating service for automobile service stations.

The forcer piston is operated in short strokes for forcing small quantities of lubricant under a very high pressure into the delivery service piping connecting with the parts to be lubricated. Delivering small quantities of lubricant with each piston forcing stroke, avoids the oozing of the lubricant from the nozzle end of the delivery tube or pipe as it is removed from the lubricating nipple or fitting, as there is no head pressure within the delivery line when the treadle is retracted. This offers economy in lubricant, and cleanliness in the use of the pump, there being no waste of lubricant in making a change in the lubricator or distributing connections.

The piston in its downward or suction stroke opens the check valve 9 and draws the lubricant into the chamber 12 and in a reverse stroke forces the lubricant through the port 15 into the distributor line. It is desirable, and for heavy or non-fluid grades of lubricant, necessary, to maintain the lubricant in the container or cylinder 7 under a head pressure to feed or press the same toward the inlet end of the discharge conduit. This is also necessary to insure a full charge with each suction stroke of the forcer piston, and to prevent the piston from operating idly as a heavy grease, unless forced toward the direction of discharge from the cylinder would lodge beyond an effective suction range of the forcer piston. In this capacity the cylinder or container is provided with a follower piston or plunger movable automatically under spring pressure and positively under a jack pressure, manually operated. The jack as a means for forcibly moving the follower piston or plunger may be of various types, in the present instance two types being illustrated, one representing a pawl and ratchet jack operated by a lever, and the second as a worm wheel and rack operated by a crank handle, the one providing an intermittent feed while the second more continuous. The follower piston or plunger preferably is of sectional form and comprises an annular follower plate 29 marginally channeled in its lower face or side to provide a seat for the packing or gasket 30, the gasket in cross section being of U form and secured to the follower plate by screws 31.

The follower plate is slidably mounted upon a counter-turned end of the piston rod 32, the hub 33 of the follower plate having its bore, through which the piston rod is engaged, provided with longitudinal slots 34, for respectively receiving the opposite ends of a pin 35 diametrically engaged through the piston rod, slidably connecting the plate to the rod. The follower plate is engaged by one end of a spring 36 concentrically engaged about the rod with the opposite end of the spring bearing against a washer 37 engaged upon the piston rod and against a shouldered edge thereof formed by counter-turning the lower end of the piston rod. The follower plate is provided with a plurality of apertures 38 therethrough providing vent openings to break or prevent the establishing of any vacuum within the cylinder at the lower side of the follower plunger in withdrawing the plunger which if permitted would render the withdrawal of the plunger difficult.

The follower plate and its packing cooperates with a valve plate 39, which may be referred to as a section of the piston slidably connected upon the end of the piston rod and independently movable upon the rod toward and from the follower plate, to establish communication between the chambers of the cylinders at the opposite sides of the follower plate through the openings 38 as the piston is moved upwardly or withdrawn from the cylinder.

The valve plate is annularly flanged, providing a valve edge 40 for engagement with the inner limb or flange of the packing 30, or with the lower face of the follower plate forming a sealing joint in the downward movement of the piston. As the piston rod is depressed, it will move the piston through the spring 36 as an intermediate connection against the head of the lubricant within the cylinder until arrested thereby, whereupon, the continued movement of the piston rod will compress the spring 36 against the follower plate or piston for maintaining a stored pressure against the piston for applying a reserve head pressure against the lubricant and eliminating the necessity of the operator continuously operating the jack while the lubricator is in service.

The follower and valve plates are in sealed engagement as long as the parts are engaged upon the head of the lubricant under a downward pressure and the piston rod is free to slide through said plates as it is fed downwardly by the jack mechanism for compressing the spring 34 so that the piston plates can be moved independent of the jack or piston rod under the influence of the stored spring pressure, it being recognized that this is of a limited capacity, as the primary feeding of the piston is through the manipulation of the jack, the jack being operated at intervals following the exhaustion of the stored energy of the spring.

When occasion for a lubricant delivery under low or no pressure is desired, as for filling grease cups, the delivery can be accomplished by exclusively operating the jack which will force the lubricant from the pump into the distributing line without manipulating the treadle and forcer piston, so that the jack feed is used in one instance for delivering a large quantity of lubricant under low or no pressure, and in a second instance for maintaining head pressure upon the lubricant supply within the cylinder when the lubricant is delivered under a high pressure by the operation of the treadle and forcer piston.

For withdrawing the pistion to replenish the lubricant supply, the jack is operated or released to enable the piston rod to be drawn upwardly. Under such action the follower plate and valve plate of the piston will be separated. In starting, the piston rod will move idly until its pin engages the follower plate and its second pin 41 engages the valve plate, the relative pin spacing permitting the two plates to be separated, whereupon, the plates will move with the rod. Separation of the piston plates will open communication of the cylinder chambers at opposite sides of the piston, relieving the piston of any suction pressure, and thereby adapting the same to be easily withdrawn.

Figure 6:
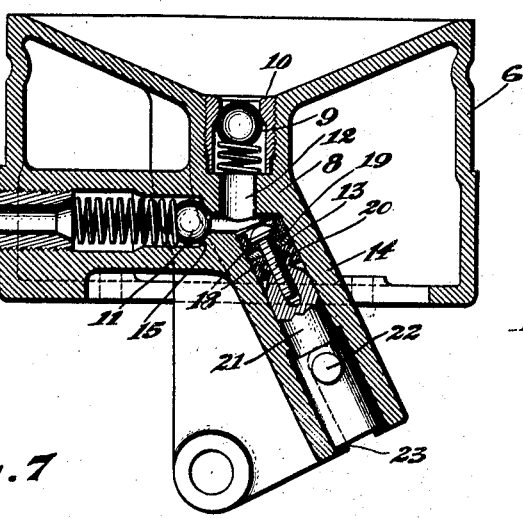
Figure 6 is an enlarged central vertical section through the lower cylinder head illustrating the check valve control or discharge distributing conduit and high pressure lubricant forcing piston.

In the form of a jack shown in Figures 1, 5, 7 and 8 embracing a pawl and ratchet type, the piston or plunger rod 32 along one of its sides is provided with ratchet teeth 42 and is engaged through and guided in a cover or head 43 hingedly secured upon the cylinder. The hinge connection is made upon a collar 44 fixed about the upper end of the cylinder. The collar is also provided with a clamping screw 45 hinged thereto at one end. The upper end of the clamp screw is provided with a wing nut 46 adapted to engage a clamp plate 46ª against the extensions 46ᵇ on the cover to lock the cover closed. The lower surface of the clamp plate is convex so as to seat in the concave top surfaces of the extensions 46ᵇ. This arrangement compels a slow release of the cover and permits any pressure in the pump to be released slowly since the wing nut must be turned before the clamp plate can be disengaged from the cover extensions. The cover has an extended housing portion integral therewith for supporting and housing a pair of pawls 47 and 48 with the pawl 47 as a rod actuating pawl pivotally connected upon the hand lever 49. The pawl 48 as a locking pawl pivots on the axis of the lever. The pawls in an effective position are engaged with the teeth of the rod by a spring 50 which is shaped or formed to serve both pawls having its ends looped to respectively engage with pins carried by the pawls. The spring is held under compression by a trip lever 51 pivoted within the housing of the cover and when its spring engaging end is swung upwardly, thus engaging the spring, both pawls are released enabling the rod to be extracted. The upper end of the plunger rod is provided with a hand grip rod 52 extending transversely through the plunger rod, which also provides a hand hold for wheeling the lubricator. The jack lever 49 is also provided with a buffer spring 53 seated within a bore in the lever for engagement with the upper end of the housing when the lever is moved to its full upward position. The cover housing carries a spring pressed detent 54 (see Figure 6) for engagement with the plunger rod to hold the same in its retracted position with the rod extending from the cover to hold the piston within the cover when the cover is swung open. Figure 9 illustrates a modified form of worm wheel or rack type operated by a crank handle. In such instance the plunger rod is provided with rack teeth 55 meshing with a worm or spiral gear 56 upon a stub shaft 57 journaled in the bearings of an inclined housing extension 58 integral with the cover housing. A ball thrust bearing 59 is interposed between the gear and a plug 60, screw threaded into the end of the housing extension 58. The shaft 57 is rotated by a crank handle 61 fixed from the end of the shaft.

Figure 10 illustrates a modified form of trip lever for holding the spring 50 under compression. A rod 65 is rotatably and translatably mounted in a bushing 66 secured in the cover or head 43. A handle 67 is provided at the outer end of the rod and the inner end of the rod engages the spring 50 in the same manner as the lever 51. Formed in the bushing 66 is an inclined slot 68 terminating at the inner end in a straight portion. A pin 69 secured in the rod engages the slot and rotation of the rod also translates the rod. The engagement of the pin in the straight slot portion prevents translation of the rod due to the pressure of the spring at the end of the rod.

Having described my invention, I claim:

1. In a high pressure lubricator, a cylinder adapted to contain grease and having a booster pump associated with the front end thereof, a rod extending slidably into the cylinder from the rear end thereof and having a sectional piston slidable thereon, one section of the piston having ports therethrough and a second section providing a movable closure for said ports, an abutment on said rod, a spring bearing at one end against said abutment and at its opposite end against the piston to urge the latter forwardly, and a locking means for the rod associated with the rear end of the cylinder, said locking means being arranged to allow the rod to be pushed forwardly but to resist rearward movement of the rod, and the sections of said sectional piston adapted to separate with the reverse movement of the rod for free movement of the rod and piston in a retracted direction, when the rod is released by said locking means.

2. In a high pressure lubricator, a cylinder adapted to contain grease and having a booster pump associated with the front end thereof, a rod extending slidably into the cylinder from the rear end thereof and having a piston slidable thereon, the piston having a valve controlled opening therethrough, the valve closing the opening with the forward movement of the piston and opening with a reverse movement, a spring bearing upon said rod and piston to urge the latter forwardly, and a locking means for the rod associated with the rear end of the cylinder, said locking means being arranged to allow the rod to be pushed forwardly but to resist rearward movement of the rod.

In witness whereof, I hereunto subscribe my name.

CLYDE G. BUTLER.